Oct. 21, 1924.
D. B. WARD
CASTING FLOAT
Filed July 10, 1922
1,512,656
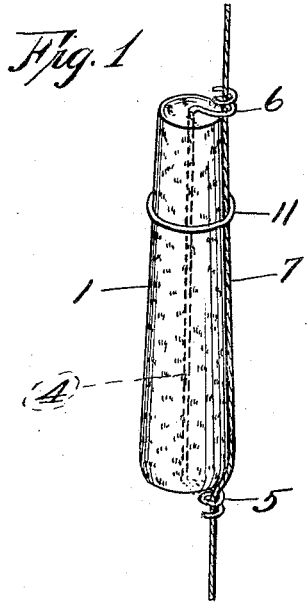
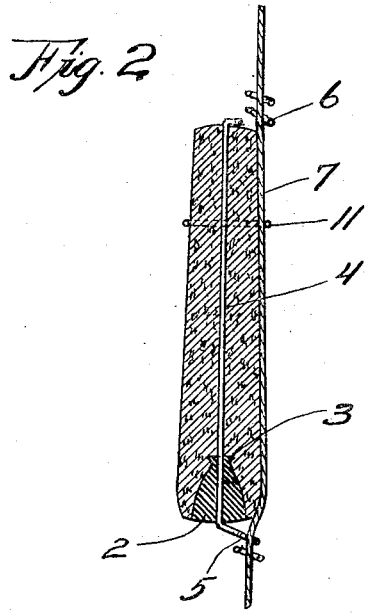
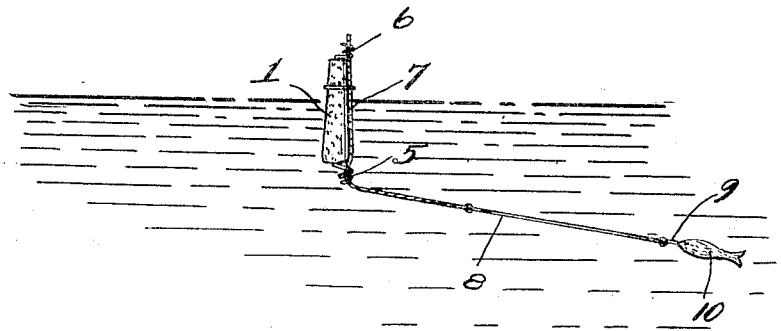

Patented Oct. 21, 1924.

1,512,656

UNITED STATES PATENT OFFICE.

DANA B. WARD, OF KANSAS CITY, MISSOURI.

CASTING FLOAT.

Application filed July 10, 1922. Serial No. 573,941.

*To all whom it may concern:*

Be it known that I, DANA B. WARD, a citizen of the United States, residing at Kansas City, in the county of Jackson and State of Missouri, have invented a certain new and useful Improvement in Casting Floats, of which the following is a complete specification.

This invention relates to casting floats and has for one of its objects to produce a float for use in casting flies or live bait which is sufficiently weighted at one end to cast well, and which, when in the water, will maintain an upright position.

Another object is to produce a device of the character described which will act as an anchor for live bait, but leave same free for darting about in the water.

A still further object is to produce a float which is provided with a very simple, quickly adjustable and efficient line adjusting means.

With the objects named in view, the invention consists in certain novel and useful features of construction and organization of parts as hereinafter described and claimed; and in order that it may be readily understood, reference is to be had to the accompanying drawing, in which:

Figure 1 is a perspective view of the device.

Figure 2 is a central vertical section taken through the same, and,

Figure 3 is a view of the device with bait attached as it will appear when in use.

In the said drawing, where like reference characters identify corresponding parts in all of the figures, 1 represents a suitable float tapering from one extremity to the other, and preferably circular in cross section, and made of cork, light wood or other suitable material.

The float is formed with a recess in its lower or larger end, and fitted in said recess is a weight 2, which may be held in position by means of an enlargement 3 at its upper end in engagement with the float, or which may be cemented or secured in any other suitable manner. The weight is sufficiently heavy to force the float to assume an upright position in the water and to function as a casting weight when throwing the line with a rod.

The float and weight are formed with registering passages, through which extends a wire 4 projecting from the float at its opposite ends and having such ends spirally bent as at 5 and 6 at the bottom and top of the float respectively. It will be evident that a line 7 may readily be threaded through the spirals into the central loops of the guides 5 and 6, where it will be free for sliding movement in either direction.

Secured to the end of the line is the customary gut leader 8 of any suitable length and attached to the leader is a hook 9 to which is secured a suitable bait 10, in the form of a live minnow, an artificial fly or any other desirable bait.

Encircling the float and line, and slidable lengthwise thereof, is a clamping ring 11 which is adapted to clamp the line against the float and hold the float securely fixed against longitudinal movement with respect to the line. It is to be understood in this connection that the line is freely slidable through the guides 5 and 6, and that the ring 11 lends itself readily to the accommodation of any of the common and well-known sizes of lines, the clamping ring engaging a small line closer to the larger or lower end of the float than a large line.

It will be obvious that the weighted float will form a casting weight, and, at the same time, when in the water serve as an anchor for the bait, leaving live bait free for darting about, and obviates the use of the customary sinker close to the bait which interferes with the freedom of the movement of live bait.

From the above description, it will be apparent that I have produced a device of the character described, which possesses all of the features of advantage set forth as desirable; and while I have described and claimed the preferred embodiment of the same, I reserve the right to make all changes properly falling within the spirit and scope of the appended claim.

I claim:—

A float tapering from one end to the other and having a cavity in one of its ends, a weight filling said cavity, a wire extending through said float and at its opposite ends being bent at substantially right angles and being twisted to form spiral guides having their axes in substantial vertical alinement beyond the side wall of the float, and a clamping element encircling the float and adjustable lengthwise thereof.

In witness whereof I hereunto affix my signature.

DANA B. WARD